Oct. 9, 1928.  
E. W. SYSTROM  
1,687,354

FREIGHT CAR DOOR PLATE

Filed Feb. 5, 1927

Inventor:  
Ernest W. Systrom  
By Macleod, Calver, Copeland & Dike  
G3 Attorneys.

Patented Oct. 9, 1928.

1,687,354

UNITED STATES PATENT OFFICE.

ERNEST W. SYSTROM, OF DETROIT, MICHIGAN, ASSIGNOR TO ROBERT T. ROMINE, OF MOUNT CLEMENS, MICHIGAN.

FREIGHT-CAR-DOOR PLATE.

Application filed February 5, 1927. Serial No. 166,098.

This invention relates to freight car door plates of the character adapted to span the space between a freight car and its loading dock or platform. A plate of the character herein described comprises a construction sufficiently sturdy to support, without any appreciable bending, industrial trucks carrying heavy loads such as ten tons when such trucks are passing into or out of a freight car.

An object of the invention is to provide a car door plate with combined means for reinforcing it at its point of maximum bending moment, which means also serve to restrict or limit the lateral movement of the car door plate relative to the car floor and loading dock or platform. It is important, with plates of this character to provide a construction which is not only sufficiently strong to support a load of approximately ten tons, but to provide stops or movement limiting means to prevent the plate from slipping out of position and allowing the truck and its load to drop into the space between the car and its loading dock.

A further object is to provide means on the top surface of the plate at opposite ends thereof for guiding the wheels of an industrial truck when entering or leaving the car. The plate may also be provided, adjacent its car floor engaging side, with one or more apertures which are adapted to register with the usual bolt receiving socket which is common upon freight car floors having double doors.

The above and other objects will be apparent from the following description and appended claims when taken in conjunction with the accompanying drawings illustrating one form of the invention.

Figure 1:
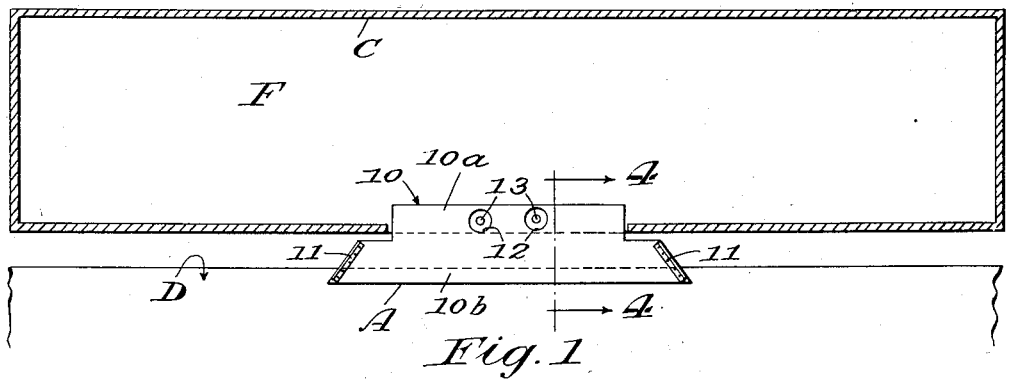
Fig. 1 is a diagrammatic view of one form of car door plate shown in position relative to a car floor and loading dock.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

In the drawings I have illustrated a freight car door plate which is employed in connection with a double door type of freight car. The plate is indicated generally at A and, is adapted to span the space between the floor F of a freight car C and the loading dock D, the sides or longitudinal edges of the plate being adapted to overlie the edge of the car floor at the door opening of the car and the outer edge of the loading dock or platform D.

The plate A has an upper plain or unobstructed surface 10 and is provided at opposite ends with truss members or angle bars 11 which serve as means to prevent the drive wheels DW of an industrial truck T, provided with the usual lift platform P, from running off the plate. The members 11 serve also as reinforcing means for the ends of the plate. The plate is provided adjacent its inner face with apertures or openings 12 which are adapted to be positioned so as to surround the lugs 13 forming a part of the door locking means provided upon the car floor adjacent the door opening of the car. On its under side, the plate A is provided with a substantially centrally disposed reinforcing plate 14 together with a plurality of transverse reinforcing plates or strips 15 of substantially the same length, together with centrally disposed parallel reinforcing plates or strips 16 positioned adjacent the apertures 12. Adjacent the opposite ends of the plate A, at its under side, likewise, reinforcing plates or strips 17 are provided, these strips 17 being in close proximity to the combined reinforcing truss members or angle bars and guide means 11. In addition to the transverse plates or strips 15, 16 and 17, and mounted thereupon, are a plurality of transverse comparatively short truss members or angle bars 18 having both horizontal and vertical flanges, the horizontal flanges being rigidly connected with the plate A and the reinforcing plates or strips 15, 16 and 17 by means of rivets or the like, 19, the strips, angle bars and main plate A being rigidly connected together to form an integral structure. The substantially centrally positioned plate 14 is likewise secured to the under face of the main plate A by rivets or the like 19. Also positioned upon the under side or face of the plate A, and extending longitudinally thereof, substantially throughout the length of the plate, is a pair of truss members or angle bars 20, which are positioned adjacent the ends of the transverse reinforcing truss members or angle bars 18. These longitudinal members 20 each have a horizontal flange portion 21 connected by rivets or the like 22 to the members 14, 15, 16 and 17 of the plate A. These members 20 serve as combined reinforcing means for the plate A and also as stops or means to limit the lateral movement of the plate relative to the car floor and loading dock or platform. It will be seen from Fig. 4 that the vertical flanges 23 of the longitudinal members 20 are preferably positioned adjacent to, but slightly out of contact with, the edge of the car floor F and the edge of the loading dock or platform D, respectively. Such positioning of the angle bars 20 to leave a space between the opposed edges of the car floor and the loading dock permits the plate A to have a slight yielding movement when the wheels of an industrial truck move into position thereupon when entering or leaving the car.

Figure 2:
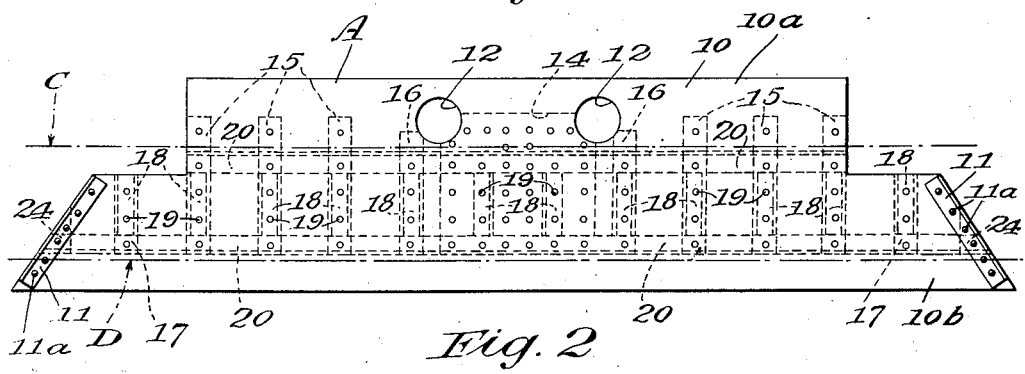
Fig. 2 is a top plan view of the car door plate of Fig. 1.
Figure 3:
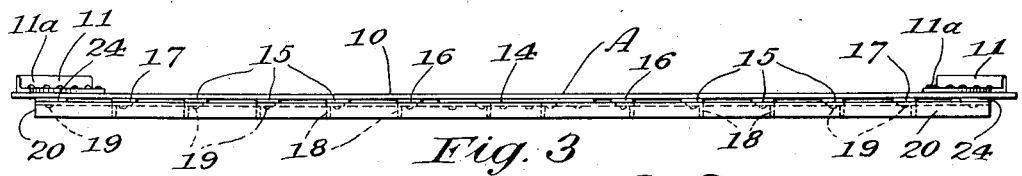
Fig. 3 is a side elevation of the plate shown in Fig. 2, looking at the forward edge thereof.

The guide members 11 are connected with the plate A by means of rivets 11ª and it will be noted (Figs. 2 and 3) that substantially triangularly shaped plates 24 are positioned adjacent each end of the plate A at its under side at a point beneath the guide bars 11. Rivets 19 serve to support the plates 24 in position beneath the plate A.

From the foregoing it will be seen that the door plate A comprises a substantially rectangular car engaging section 10ª and a substantially trapezoidal platform engaging portion or section 10ᵇ of greater length than the car floor engaging portion or section. Therefore, a door plate is provided which is of adequate length opposite the car door opening to permit a truck to run upon it and into or out of the car at any desired angle.

Figure 4:
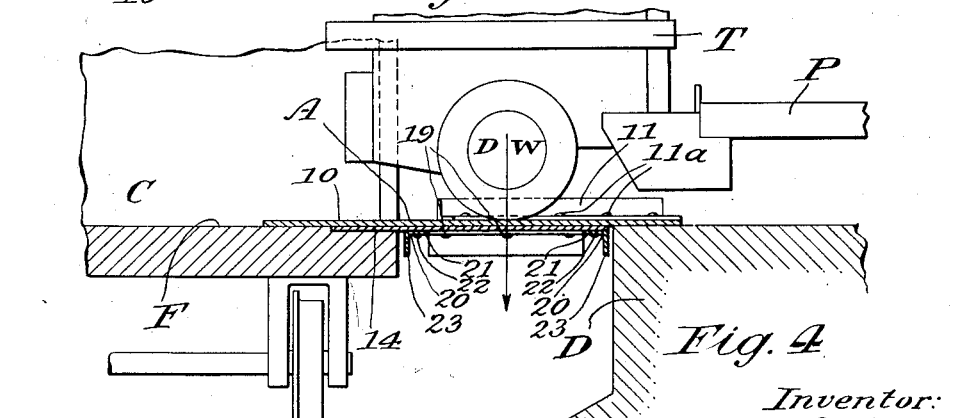
Fig. 4 is a cross sectional view of one of the plates of this invention shown in operative relation to a freight car and its loading dock with the drive wheels of an industrial truck in position upon the plate, said truck being shown in elevation.

In Fig. 4 the arrow indicates the point of maximum bending moment when the truck T is in the position shown, the plate receiving at that point the greater part of the weight of the industrial truck and its load when in position upon the plate. It is important to adequately reinforce the plate to withstand the strain imposed upon it by a truck, and this is accomplished in this invention by means of the parallel lateral reinforcing truss members or angle bars and the combined longitudinal reinforcing truss members and stops, previously described.

It will be understood that the car door plates of this invention may vary in size in accordance with the particular use to which they are to be put. Likewise, different arrangements and combinations of reinforcing members, such as the truss members or angle bars herein described, may be employed.

With the type of plate illustrated in the drawings, namely that type adapted to be employed in conjunction with freight cars having double doors, it will be noted that by providing the apertures 12 in the section 10ª of the plate, the plate may be positioned and held in place upon the edge of the car floor. The lug or locking member 13 will register with the aperture and, the plate A being of sufficient thickness, will prevent such lug from protruding or projecting above the top surface of the plate thereby forming an obstruction in the path of the wheels of the industrial truck.

The plates of this invention, are of sufficient strength to withstand the strains, stresses and shocks to which they are subjected by the passage thereover of an industrial truck and its load aggregating in some instances, approximately ten tons or more, and are adapted to withstand, without any appreciable amount of bending or buckling, loads of such capacity.

What I claim is:

1. A door plate for freight cars adapted to span the space between a car and a loading dock, said plate having an aperture adjacent one side adapted to register with a stud on the car floor adjacent the door opening when the plate is in operative position, guide means at opposite ends of the plate, and reinforcing means on the under side of the plate adapted to strengthen said plate at its point of bending moment.

2. A door plate for freight cars adapted to span the space between a car and a loading dock, said plate having an aperture adjacent one side adapted to register with a stud on the car floor adjacent the door opening when the plate is in operative position and a plurality of angle bars on the under side of the plate adapted to reinforce the same and to limit the lateral movement of the plate relative to the car floor and the loading dock.

3. A door plate for freight cars adapted to span the space between a car and a loading dock, said plate having an aperture adjacent one side adapted to register with a projection on the car floor adjacent the door opening when the plate is in operative position, parallel laterally extending truss members beneath the plate for reinforcing said plate at its point of bending moment, and longitudinal truss members positioned adjacent the ends of said transverse truss members for reinforcing the plate and restricting its lateral movement relative to the car floor and loading dock.

In testimony whereof I affix my signature.

ERNEST W. SYSTROM.